April 9, 1940.  A. GRONERT  2,196,391

VENTILATING PLANT FOR GOODS PILED UP SUCH AS GRAIN

Filed Jan. 21, 1937  2 Sheets-Sheet 1

Inventor:
AUGUST GRONERT
by Walter S. Bleistein
ATTORNEY

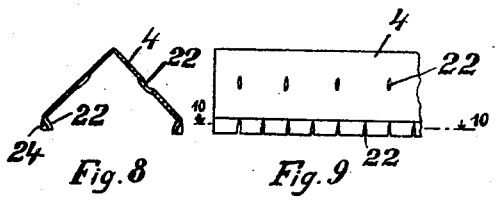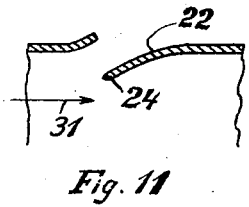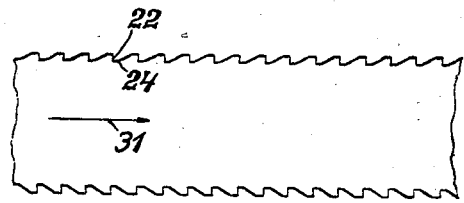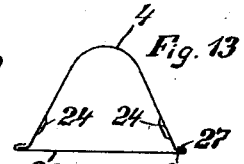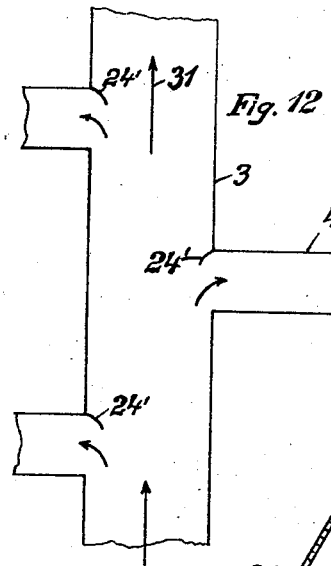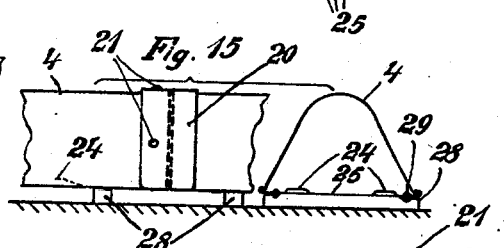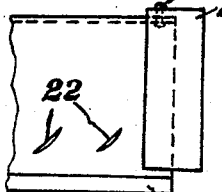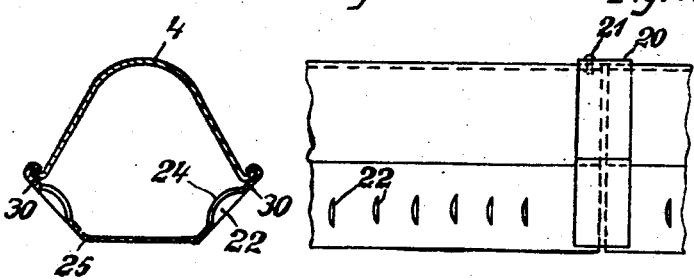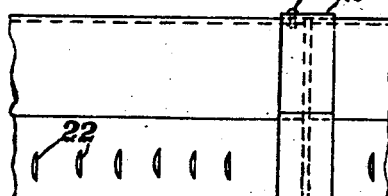

Patented Apr. 9, 1940

2,196,391

UNITED STATES PATENT OFFICE 2,196,391

VENTILATING PLANT FOR GOODS PILED UP SUCH AS GRAIN

August Gronert, Furstenwalde-on-the-Spree, Germany

Application January 21, 1937, Serial No. 121,642
In Germany January 21, 1936

2 Claims. (Cl. 98—56)

My invention relates to a plant for ventilating and eventually at the same time drying of goods piled up such as grain or other granular goods on the ground or in store houses of any kind.

One point of my invention is to provide a ventilating plant containing a main air supply element and distributing elements connected to it and lying on the ground or on the floor of the store house etc. which can be easily erected or dismantled and stored away, all the parts of the plant being movable.

A further point of my invention is to prevent any parts of the goods piled up, regardless how small they may be, from entering into the air conducting and distributing elements which are connected together and to prevent clogging of the pipe line system formed by the elements.

A further point of my invention is to provide not expensive and simple shapes and arrangements of the distributing elements so that the elements and the ventilating system can be assembled and disassembled easily and do not take much space for storing when they are not used.

A further point is that the air flow is safely led into the goods quite uniformly at all points of the distributing system. At the same time the driving power needed for pressing the air through the system and into the goods is relatively small.

A further point is to provide a device in which one fan with or without an air heater can be readily used in connection with a number of ventilating systems which may be installed at different parts, departments or boxes of a store place or store house.

Other purposes, advantages and objects of my invention will be understood from the following description of the drawings showing some embodiments of my invention.

Figs. 8 and 9 are the cross section and side view of a different embodiment with the air outlet perforations arranged in a different manner.

Fig. 10 is a horizontal sectional view of the element taken on the line 10—10 of Fig. 9.

Fig. 11 is a fragmentary sectional view of the wall of a distributing element taken near an air outlet on a larger scale.

Fig. 12 shows diagrammatically a fragmentary view of the main air conductor and the joints of the branching off distributing elements.

Fig. 13 is a section of a distributing element consisting of two parts.

Fig. 14 shows the two parts of Fig. 13 disassembled and the similar parts piled up for storing purposes.

Fig. 15 shows a distributing element consisting of two different parts in side elevation and front view.

Fig. 16 is a cross section on a larger scale of an element similar to Fig. 13.

Fig. 17 is a fragmentary side view of the same element.

Figs. 18 and 19 show a further form of a distributing element in front section and side elevation.

Figure 1:
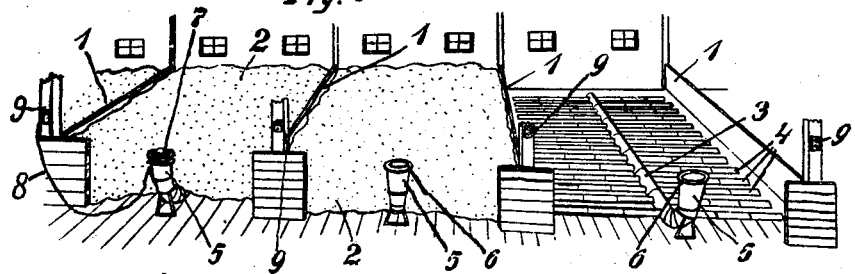
Fig. 1 is a view of three compartments of a store house supplied with ventilating plants according to my invention.

According to Fig. 1 three boxes of a store house are separated by walls 1 from one another and each provided with a ventilating plant according to my invention. In two boxes the goods 2 are heaped up and cover the distributing elements of the ventilating plant while in the third box at the right hand side the plant is erected but the grain or other goods is or are not yet poured onto it.

The plant comprises a main air conducting element 3 and distributing elements 4 branching off. The main element and the distributing elements are provided with air outlets or perforations. There is a separate plant with a main conducting element and a number of distributing elements provided for each one of the compartments or boxes. The end piece of the main element is turned upwards forming a bow 5 with an essentially horizontal inlet opening 6. At the inlet end of the bow a pump or fan, preferably an axial fan 7 is connected, in such a way that it can easily be disconnected e. g. by lifting the fan, or the fan can be introduced into the bow end and removed when it is not used. As in many cases a temporary or intermittent ventilation is sufficient a removable fan 7 can be easily used in connection with a number of ventilating plants according to the invention. Fig. 1 shows the fan 1 mounted on the main air conductor 3 of the left hand box and the fan motor connected by a cable 8 to a plug 9 and switch or the like of the main electric supply system. When the ventilation of the left hand box is finished the fan can be removed and mounted on the main air conducting element of another box. Of course more than one fan and eventually a separate fan for each box can be provided.

Figure 2:
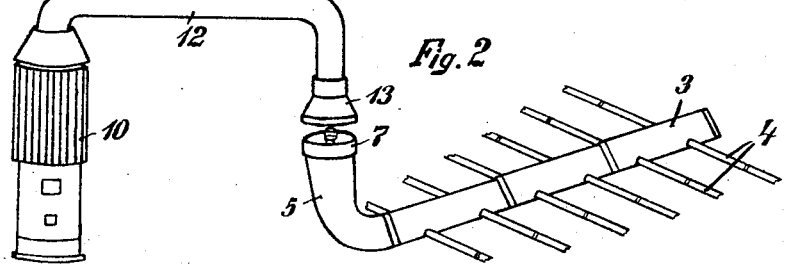
Fig. 2 is a view of a ventilating plant with an air heater showing the connecting tube between the both.

Fig. 2 shows the bow end 5 of the main element 3, a fan 7 which can be quickly disconnected from the bow end, a tube arrangement 12 hanging on ropes 11 or supported by trestles on the floor and connecting the bow 5 with an air heater 10 which is heated by gas, steam or a fire. The end of the tube 12 near the fan is provided with a funnel piece 13 which can be movable and adjustable in a certain position. By the position of the funnel 13 the clearance between the tube 12 (funnel edge) and the bow 5 can be increased or decreased so that different mixtures of the heated air and the cooler atmosphere can be attained at will.

Figure 3:
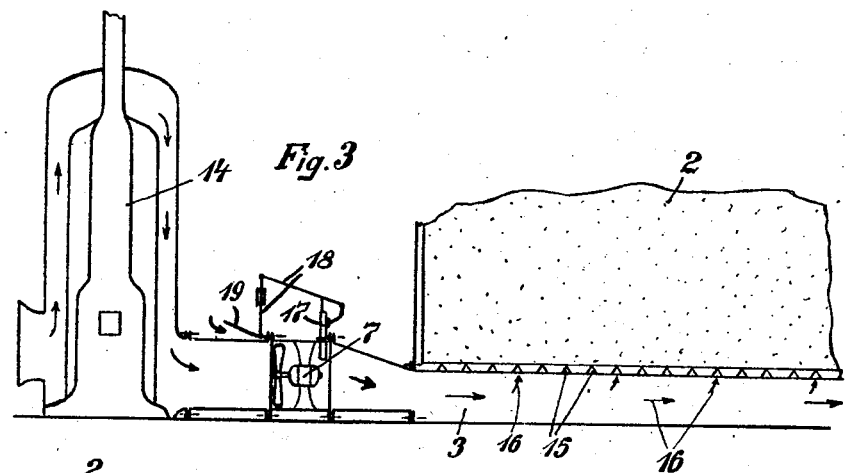
Fig. 3 shows a different connecting arrangement between the ventilating system and the air heater.
Figure 4:
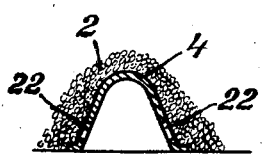
Fig. 4 is a sectional view of a distributing element.
Figures 5, 6:
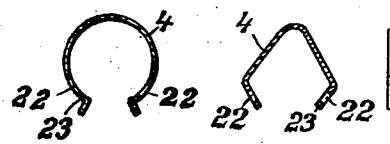
Fig. 5 shows a different cross section of a distributing element.
Figs. 6 and 7 are the cross section and a side view of a distributing element the edges of the side walls being inclined to approach each other.
Figure 7:
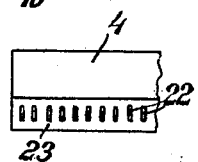

Fig. 3 shows another method of connecting the main element 3 of the ventilating plant for piled up goods 2 with an air heater 14. By the fan 7 hot air is sucked in from the heater 14 and pressed through the air conducting element 3 and outlets 15 into the goods 2 as indicated by the arrows 16. As seeds cannot stand a high temperature an automatic pyrometer of a known design is provided. It consists of a detent body 17 connected by a lever arrangement 18 to a damper plate 19 or valve through which fresh air is added to the heated air. The damper is so controlled that enough fresh air is mixed to the hot air to avoid the surpassing of a maximum temperature which is given for certain goods.

The main air conducting element 3 as well as the conducting and distributing elements 4 consist of elements or pieces which are joined together, e. g. by introducing the ends of one element into the end of the adjoining element. The elements can have a roof-like, angular, or channel shaped cross section which is open at the bottom as is indicated in Figs. 4 to 9. When they are not used the elements according to Fig. 14 can be put one into the other so that a small space is only needed for storing. The elements can be connected together like a telescope. In order to have elements of the same diameter and bore a butt-joining of the elements is preferred. The clearance between two joining elements is bridged by a shell-like piece 20 which can be riveted at 21 to one element and overlaps the other. Such connections are shown by Figs. 15, 17 and 19. The air outlets 22 of the distributing system 4 can be formed and arranged differently. According to Fig. 4 the outlets are near the lower edges of the channel-like element but are surrounded by the wall material. According to Figs. 5–10 the air outlets 22 are perforations in the side walls of the elements which are partly inclined and bent or curved inwards at 23. According to Figs. 5–7 the outlet openings are surrounded by the wall material. According to Figs. 8–10 the outlets are slots cut in from the edge part of the channel elements.

In any case the distributing elements 3, 4 are provided with baffles 24 at a given angle opposite to the direction of flow of the air. By the baffles the air is forced sideways into the goods. The baffles 24 can be formed from the sheet material adjacent to the outlets or perforations 22.

In Figs. 10–11 the direction of the air flow is indicated by the arrows 31 and the action of the baffles 24 branching off the air sideways is obvious. According to Figs. 8–10 the outlets 22 and baffles 24 are close together at the edges of the elements 4 resting on the ground. Preferably baffles are provided as well at outlets which are surrounded by the wall material.

At the joints of the main air way 3 and the distributing elements 4 baffles 24' are provided as well to force corresponding parts of the air into the branches 4 as shown in Fig. 12. The distributing elements 3, 4 of the ventilating system can have a closed cross section. Then the air outlet openings are arranged at the bottom part or near it. The closed cross section can be formed from two parts which are connected at longitudinal lines and can be disconnected easily as shown in Figs. 13–19.

According to Fig. 13 the elements consist of a roof-like upper part 4 and a removably connected bottom plate 25. The connection is formed by sliding the bent rim 26 of the part 4 into the folded rim 27 of the part 25. When they are not used the plates 25 are drawn out of the parts 4 and the plates as well as the channel or roof-like parts 4 can be piled up for storing purposes.

Fig. 15 shows a two part element of a similar shape, but having leg 28 affixed to the bottom plate 25 e. g. by rivets 29, and the air outlet perforations 22 and baffles 24 arranged at the bottom.

Figs. 16 and 17 correspond to Figs. 13 and 14 but the outlets 22 are arranged at an angle.

Figs. 18 and 19 show a different bottom part 25 with sloping edges 30 where the outlets 22 are arranged.

I claim:

1. A ventilating plant for goods piled up such as grain, comprising substantially horizontally laid perforated conducting and distributing elements, a main supply element connected to them, and means for feeding air to said supply element, the distributing elements consisting each of a substantially V-shaped upper part and a bottom part having side walls inclined so as to converge towards the bottom, said upper part and said bottom part being removably connected to each other and the perforations of said distributing elements being arranged only in said inclined side walls of said bottom part.

2. A ventilating plant for goods piled up such as grain, comprising substantially horizontally laid perforated conducting and distributing elements, a main supply element connected to them, means for feeding air to said main supply element, and baffles within said distributing elements adjacent the perforations thereof, the said distributing elements having an upper portion of roof-like shape and a lower portion with side walls inclined so as to converge towards the bottom, and the perforations and the baffles being arranged only in the inclined portions of said side walls.

AUGUST GRONERT.